L. MESSER.

Assignor to ZINN & MESSER.

Fastening for Pocket-Books.

No. 8,123. Reissued March 12, 1878.

Witnesses.
Chas Wahlers.
E. F. Kastenhuber

Inventor.
Louis Messer
per
Van Santvoord & Hauff
attys.

N. PETERS. PHOTO-LITHOGRAPHER, WASHINGTON, D. C.

UNITED STATES PATENT OFFICE.

LOUIS MESSER, OF NEW YORK, N. Y., ASSIGNOR TO ZINN & MESSER, OF SAME PLACE.

IMPROVEMENT IN FASTENINGS FOR POCKET-BOOKS.

Specification forming part of Letters Patent No. 163,794, dated May 25, 1875; Reissue No. 8,123, dated March 12, 1878; application filed March 5, 1878.

*To all whom it may concern:*

Be it known that I, LOUIS MESSER, of the city, county, and State of New York, have invented a new and useful Improvement in Clasps for Pocket-Books, which improvement is fully set forth in the following specification, reference being had to the accompanying drawing, in which—

Figure 1:
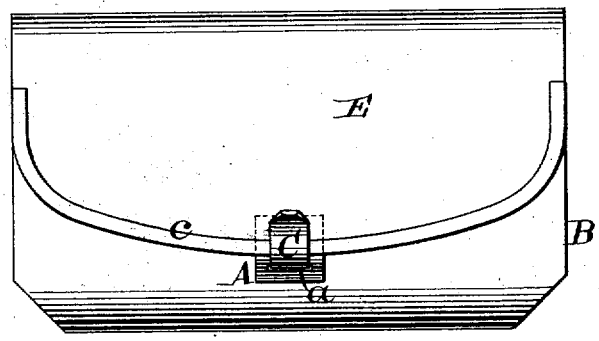
Figure 2:
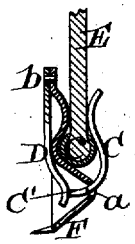
Figure 3:
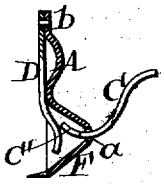
Figure 4:
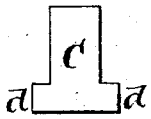

Figure 1 represents a face view of my clasp applied to a pocket-book. Fig. 2 is a cross-section thereof, showing the same detached in a closed condition. Fig. 3 is a like section, showing the same in an open condition. Fig. 4 is a view of the cap detached from the supporting-case.

Similar letters indicate corresponding parts.

The object of my invention is mainly to simplify the construction of pocket-book clasps, and hence to reduce the cost of manufacturing such articles.

It consists in the combination of a supporting-case, a cap having a tail-piece, which is adapted to engage with the supporting-case, and which permits the cap to swing in and out, and a spring which is attached to the case and bears on said tail-piece of the cap, so that by the action of such spring the cap is held in engagement with the supporting-case either when open or closed, and the labor required for producing the ordinary hinge-joint is saved.

With the parts enumerated is combined an abutment, attached to the flap of the pocket-book, to which the whole is applied, whereby I insure the retention of the flap by the clasp.

In the drawing, the letter A designates the supporting-case of my clasp, which is so constructed that it can be secured to a pocket-book, as shown in Fig. 1. This case is provided with a slot, *a*, through and around which is bent one end of the cap C, so as to form a tail-piece, C′, at such end of this cap.

The cap C is composed of a piece of flat metal, and its tail-piece is provided with projections *d*, (see Fig. 4,) which catch under the case A at the ends of the slot *a*, and by this means an engagement of the cap C is formed with the case. Within the case A is located a spring, D, which is riveted thereto, as at *b*, and which bears on the tail-piece C′ of the cap, so that the latter is prevented from becoming disengaged from the case in either of its positions.

I so arrange the spring D relatively to the tail-piece of the cap C that, by the action of the spring, the cap is fixed in two of its positions, one position being parallel to the case A, or shut, as shown in Fig. 2, and the other position being at an angle to the case, or open, as shown in Fig. 3.

In the present example of my invention I have shown my clasp as used in conjunction with a pocket-book whose flap E is provided with an abutment, *c*, the same being formed by the rim-piece of the flap. This abutment or rim-piece *c* is composed of a strip of sheet metal, which is bent on the edge of the leather or other material composing the flap E in such a manner as to bite into the leather and obtain a firm hold of said edge.

If, when the cap C is adjusted to the position shown in Fig. 2, the flap E or its abutment *c* is placed thereunder, the cap interlocks with the abutment, and by this means the flap is firmly held shut, whereas when the cap C is raised and turned from the position shown in Fig. 2 to that of Fig. 3 the flap is released.

That portion of the case A which receives the tail-piece C′ has the form of a ridge, F, which constitutes a stop to the flap E, and admits of bringing the cap C above the abutment *c* with facility.

It will be seen from this description that in the construction of my spring-clasp only three pieces are used—viz., the spring, the cap, and the supporting-case—while the cap and the case are so arranged that when they are properly placed together the required hinge-joint is produced without requiring any further labor, and by the action of the spring said cap and case, after having been put together, are retained in proper relation to each other, allowing the cap to open and to close, as above stated.

What I claim as new, and desire to secure by Letters Patent, is—

1. The combination, in a spring-clasp, of a supporting-case, a cap having a tail-piece which is adapted to engage with the supporting-case, and which allows the cap to swing in and out, and a spring which is secured to the supporting-case and bears on the tail-piece of the cap, said case and cap being connected together without the use of a pintle, substantially in the manner and for the purpose herein shown and described.

2. The combination, in a spring-clasp, of the cap C, supporting-case A, spring D, and the abutment *c*, all constructed and adapted to operate substantially as described.

In testimony that I claim the foregoing I have hereunto set my hand and seal this 4th day of March, 1878.

LOUIS MESSER. [L. S.]

Witnesses:
W. HAUFF,
CHAS. WAHLERS.